United States Patent
Chang et al.

(10) Patent No.: US 8,574,435 B2
(45) Date of Patent: Nov. 5, 2013

(54) ADVANCED TREATMENT SYSTEM OF WASTEWATER HAVING PLASMA DISCHARGING VESSEL

(75) Inventors: In Soung Chang, Cheonan-si (KR); Ji Sun Lee, Chungcheongnam-do (KR); Seun Young Joung, Cheonan-si (KR); Cheol Ku Lee, Cheonan-si (KR)

(73) Assignees: Hoseo University Academic Cooperation Foundation, Chungcheongnam-Do (KR); Kumkang Environmental Engineering Co., Ltd., Chungcheongnam-Do (KR)

( * ) Notice: Subject to any disclaimer, the term of this patent is extended or adjusted under 35 U.S.C. 154(b) by 0 days.

(21) Appl. No.: 13/379,343

(22) PCT Filed: Nov. 22, 2010

(86) PCT No.: PCT/KR2010/008243
§ 371 (c)(1),
(2), (4) Date: Dec. 19, 2011

(87) PCT Pub. No.: WO2011/096636
PCT Pub. Date: Aug. 11, 2011

(65) Prior Publication Data
US 2012/0285878 A1 Nov. 15, 2012

(30) Foreign Application Priority Data
Feb. 5, 2010 (KR) .................. 10-2010-0010952

(51) Int. Cl.
C02F 9/14 (2006.01)

(52) U.S. Cl.
USPC ...... 210/243; 210/748.01; 210/153; 210/739; 210/195.1; 210/614; 205/753; 427/535

(58) Field of Classification Search
USPC ............ 210/243, 748.01, 153, 614, 617, 621, 210/739, 195.1, 500.21; 205/753; 427/535
See application file for complete search history.

(56) References Cited

U.S. PATENT DOCUMENTS 6,228,266 B1 * 5/2001 Shim ............................ 210/614
2009/0308804 A1 * 12/2009 Cohen et al. ............. 210/500.21

FOREIGN PATENT DOCUMENTS

CN 101348304 1/2009
JP 9-225492 9/1997

(Continued)

OTHER PUBLICATIONS

Choi, et al., "Enhanced anaerobic gas production of waste activated sludge pretreated by pulse power technique," Bioresource Technology, vol. 97 (2006), Apr. 2005, 6 pages.

(Continued)

Primary Examiner — Khanh Nguyen
Assistant Examiner — Cameron J Allen
(74) Attorney, Agent, or Firm — Lee, Hong, Degerman, Kang & Waimey

(57) ABSTRACT

Disclosed herein is an advanced treatment system processing contaminated water or fouled water/waste water, and particularly, a system for membrane fouling control and reduction in the amount of sludge producing in a membrane combined-type fouled water/waste water advanced treatment system, and more particularly, a system capable of making sludge soluble using plasma and then re-utilizing cell byproducts of destructed sludge as a supply source of external carbon source, and possibly capable of removing a cake layer formed on a membrane using each kind of radical and ozone generated by plasma.

4 Claims, 2 Drawing Sheets

(56) References Cited

FOREIGN PATENT DOCUMENTS

| | | |
|---|---|---|
| JP | 11-253999 | 9/1999 |
| JP | 2001-314890 | 11/2001 |
| JP | 2002-1350 | 1/2002 |
| JP | 2002-192188 | 7/2002 |
| JP | 2003-211178 | 7/2003 |
| JP | 2005-066381 | 3/2005 |

OTHER PUBLICATIONS

State Intellectual Property Office of the People's Republic of China Application Serial No. 201080036172.4, Office Action dated Jan. 22, 2013, 8 pages.

Japan Patent Office Application Serial No. 2012-525503, Office Action dated Jul. 9, 2013, 2 pages.

* cited by examiner

ADVANCED TREATMENT SYSTEM OF WASTEWATER HAVING PLASMA DISCHARGING VESSEL

This application is a the National Stage filing under 35 U.S.C. 371 of International Application No. PCT/KR2010/008243, filed on Nov. 22, 2010, which claims the benefit of earlier filing date and right of priority to Korean Patent Application No. 10-2010-0010952, filed on Feb, 5, 2010, the contents of which are all hereby incorporated by reference herein in their entirety.

TECHNICAL FIELD

The present invention refers to an advanced treatment system processing contaminated water or foul water/waste water, and particularly, to a system for membrane fouling control and reduction in the amount of sludge producing in a membrane combined-type fouled water/waste water advanced treatment system, and more particularly, to a system capable of making sludge soluble using plasma and then re-utilizing cell byproducts of destructed sludge as a supply source of external carbon source, and possibly capable of removing a cake layer formed on a membrane using each kind of radical and ozone generated by plasma.

BACKGROUND ART

Currently, sludge produced in a general fouled/waste water disposal plant is finally exterminated through a physicalcochemical process and then an oceanic dumping, a burial, an icineration, and a compost procedure. In the domestic situation, since a newly construction of a burial site and an incineration facility is limited by a NIMBY attitude, a final disposal of generated sludge depends on an oceanic dumping in a considerable portion. An efficient sludge disposal or an amount-reduction technology is necessiated because an oceanic dumping will be nevertheless bannded from the year of 2012 based on London Convention '96 protocol' effectuation.

Also, while a membrane combined-type bioreactor (MBR) being membrane combined has commercialized into an existing advanced treatment process, an advanced treatment process including a bioreactor has safely settled into a core technology of a fouled water/waste water treatment fields. However, in such a membrane combined-type bioreactor, the problem emerges of a chronic film fouling by a cake layer formed on a membrane surface. A film contamination, causing permeability of a membrane to be lowered, acts as a big stumbling block in a stable water purification.

FIG. 1 is a mimetic diagram indicating a previous membrane combined-type fouled water/waste water advanced treatment system. As shown in herein, a previous membrane combined-type fouled water/waste water advanced treatment system operates in which fouled water/waste water basically passes through an anaerobic vessel 10, an anoxic vessel 20 and an aerobic vessel 30 submerged with a membrane 90 continuously, high-degree processed purified water is finally outflowed, a part of sludge producing with this is conveyed, and the remaining sludge is discharged outdoors and discarded.

Sludge discarded at a previous membrane combined-type fouled water/waste water advanced treatment system mostly has been processed through oceanic dumping, burning, burial, for example. Because such a process approach is a method based on a post processing technology accompanying a secondary contaminant, there is a problem that fails to be a fundamental solution method for sludge disposal.

On the one hand, in the case of an advanced treatment using a bioreactor (MBR), in order to remove a cake layer deposited on a membrane surface in a certain period the membrane must be cleaned, but conventionally it was cleaned using mostly chemicals. However, in the case of chemicals, a disadvantage that resultant contaminants occur exists. Also, there is a method of controlling by endowing a shearing force at a cake layer formed on a membrane surface for coarse aeration, but energy used for aeration is a disadvantage of necessitating high energy occupying more than 60% of an overall wastewater disposal facility.

DISCLOSURE OF INVENTION

Technical Problem

The present invention has been made to solve the above problems, and it is an object of the present invention to provide a highly-developed process system of making sludge soluble and then re-employing cell byproducts of destructed sludge into a supply source for external carbon source.

Coexistent with this, the present invention intends to provide an advanced treatment system capable of removing a cake layer formed on a membrane of a bioreactor.

Furthermore, the present invention intends to provide high availability because of simply and easily applying to an existent advanced treatment system without replacing an existing membrane combined-type fouled/waste water advanced treatment system altogether.

Solution to Problem

To achieve the above objective, the present invention comes with a fouled/waste water advanced treatment system containing an anaerobic vessel, an anoxic vessel and an aerobic vessel, the plasma discharge vessel possessing fouled/waste water advanced process system including a plasma discharge vessel continuously disposed to the aerobic vessel, a waste sludge conveyor pipe transferring sludge issued at the aerobic vessel into the plasma discharge vessel, and a sludge conveyor pipe transferring sludge byproducts discharged at the plasma discharge vessel into the anoxic vessel.

Herein, the aerobic vessel may include a submerged-type membrane for a membrane bioreactor (MBR).

And, the aerobic vessel and the plasma discharge vessel may include a means capable of removing/attaching a submerged-type membrane in their inside respectively.

In such a present invention, the plasma discharge may include in its inside a submerged-type membrane that was installed at an interior of the aerobic vessel.

Also, it is preferred to include a means capable of selectively managing a sludge high voltage discharge mode operating the plasma discharge vessel in a state installed with a submerged-type membrane inside the aerobic vessel, and a submerged-type membrane cleaning mode operating a plasma discharge vessel in a state mounted with the submerged-type membrane inside the plasma discharge vessel.

Specific matters of other embodiments are included in a detailed description and drawings.

Advantageous Effects of Invention

The aforementioned present invention may provide an advanced treatment system capable of basically solublizing sludge using plasma and afterwards employing cell byproducts of destructed sludge again into a supply source for external carbon source.

That is to say, it can be achieved of generating radical and ozone high in oxidizing power by the aquous high voltage discharge of plasma, making sludge soluble by enabling them to act as a powerful oxidizing agent against sludge made by an existing advanced treatment system, and through this reducing in amount of the sludge.

In general, considering, because the domestic fouled/waste water has a low C/N ratio, an anoxic vessel in an advanced treatment procedure should supply external carbon source such as methanol separately, because the present invention may convey the solublized sludge into an anoxic vessel to be recycled, a saving effect of sludge disposal cost and system management cost is expected.

Together with this, the invention may provide an advanced treatment system in which a cake layer formed on a membrane can be removed by each kind of radical and ozone generated by plasma. That is, by moving a membrane bioreactor possessed in an aerobic vessel into a plasma reaction vessel, and oxidizing a cake layer formed on a membrane surface of the membrane bioreactor using each type of radical and ozone having high oxidation power produced by plasma, an effect of controlling contamination on a membrane is created.

Furthermore, such a present invention has high availability on account of the possibility of simply and easily applying to an existing advanced treatment system, because only a plasma reaction vessel is additionally combined and have a membrane bioreactor removed/attached herein without entirely changing an existent membrane combined-type fouled/waste water advanced treatment system.

BEST MODE FOR CARRYING OUT THE INVENTION

Hereinafter, a preferred one embodiment of the invention will be described in detail with reference to the annexed drawings. The present invention would be further better understood through the following embodiment, and the followed embodiment is for an exemplary purpose of the invention, but not in the least meant to limit a protection scope defined by the accompanying claims.

Figure 1:
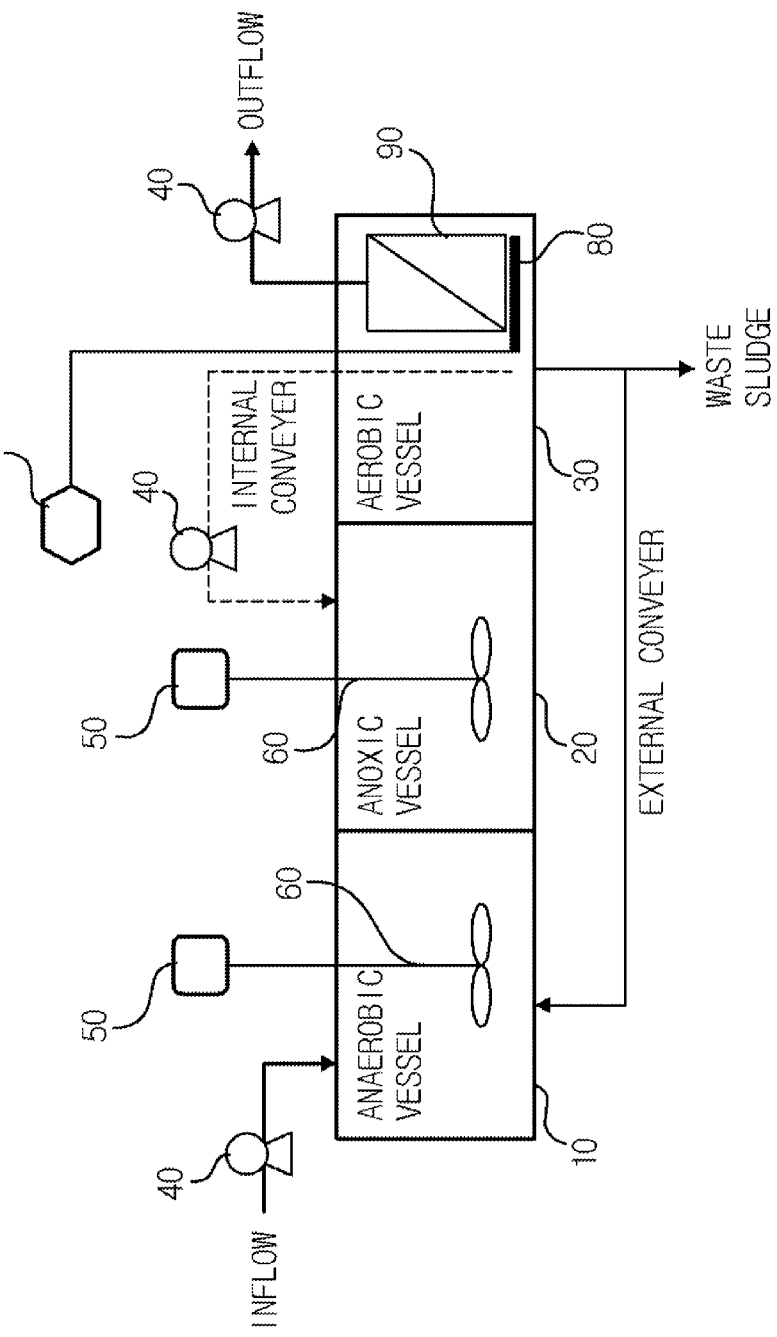
FIG. 1 is a mimetic diagram indicating a previous membrane combined-type fouled/waste water advanced treatment system.
Figure 2:
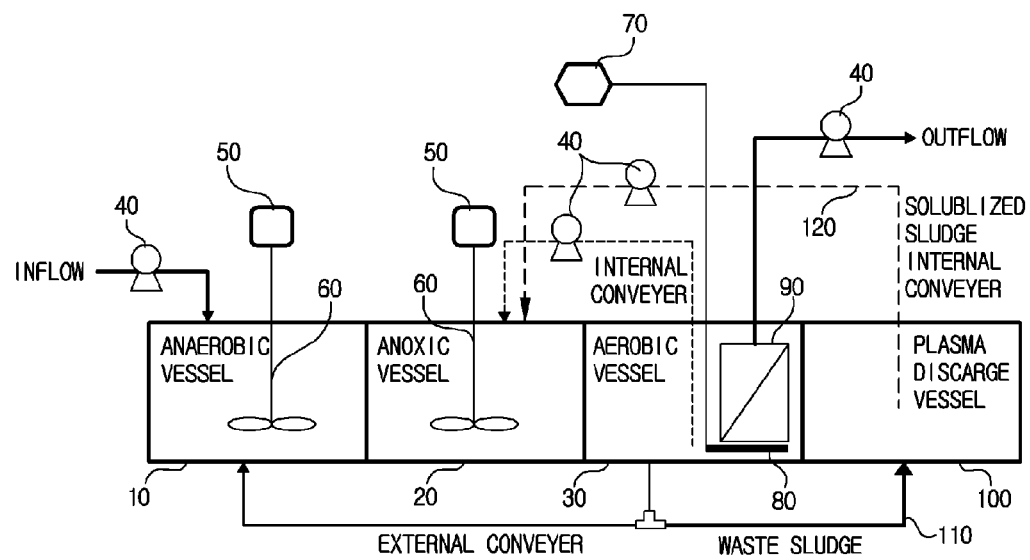
FIG. 2 is a mimetic diagram for describing one example of a drive mode (sludge electric discharge mode) of a membrane combined-type fouled/waste water advanced treatment system with a plasma discharge vessel introduced according to the invention.

FIG. 2 is a mimetic diagram for describing one example of a drive mode (sludge electric discharge mode) of a membrane combined-type fouled/waste water advanced system with a plasma discharge vessel according to the present invention.

As shown in the figure, the present invention is basically related to an advanced treatment system in which an anaerobic vessel 10 and an anoxic vessel 20 and an aerobic vessel 30 submerged with a membrane 90 are connectively disposed. The anaerobic vessel 10 and the anoxic vessel 20 and the aerobic vessel 30 are side by side disposed, and it is preferred to have a separate pipe or hole or means delivering inflowed fouled water. The membrane 90 may be a submerged membrane combined with a previous general MBR (Membrane Bioreactor).

Through this, contaminated water or domestic sewage or fouled/waste water passes through the anaerobic vessel 10, the anoxic vessel 20 and the aerobic vessel 30 consecutively, and high-degree disposed purified water is finally outflowed, and it is possible that a part of sludge occurring with together is conveyed by an external conveying to the anaerobic vessel 10, and conveyed to the anoxic vessel 20 by an internal conveying. Such a fouled/waste water advanced treatment system includes all the advanced treatment systems well-known in this technology field.

The present invention is regarding a fouled/waste water advanced treatment system having a plasma discharge vessel, characterized by a plasma discharge vessel 100, a waste sludge conveyor pipe 110, and a sludge conveyor pipe 120 in the above described fouled/waste water advanced treatment system. That is, the present invention employs plasma for sludge reduction in amount and membrane fouling control, and to do this, the present invention is characterized by additionally combining a plasma reaction vessel 100 with a conventional advanced treatment system containing an anaerobic vessel 10, an anoxic vessel 20 and an aerobic vessel 30.

The plasma discharge vessel 100 literally refers to a tank affordable at the discharge of plasma, especially far from limiting itself to a method or a type of discharging plasma and the shape of a tank. The present invention is characterized by performing a plasma discharge process for sludge issued through a submerged-type membrane 90 of an aerobic vessel 30, wherein it is preferable to have a waste sludge conveyor pipe 110 transferring sludge issued at the aerobic vessel 30 into the plasma discharge vessel 100, and it is more preferable that the plasma discharge vessel 100 is connectively disposed from an aerobic vessel 30. An arranged direction or combined means is not specially limited.

Therefore, the present invention is characteristic of conducting a plasma discharge process on sludge of a plasma discharge vessel 100 that previously transferred in the plasma discharge vessel 100 through the waste sludge coneveyor pipe 110. Since hydroxyl radical producing on a plasma discharge is high in oxidizing power, a decomposition of sludge may be promoted, thereby capable of contriving sludge solublization. That is, by applying plasma to cell walls of surplus sludge difficult to destruct by means of existing physicalcochemical methods and thus easily destroying the cell walls, sludge can be transformed a status of organic source that is useful to use by microorganisms, that is to say, low molecular fatty acid.

As such, sludge byproducts transformed by a plasma discharge process can be employed as a supply source of external carbon source. For this, the present invention is characteristic of including a solublization sludge (internal) conveyor pipe 120 transferring sludge byproducts electric discharged at the plasma discharge vessel 100 to the anoxic vessel 20. The present invention, through this, may employ sludge discharged and discarded in the prior art from an aerobic vessel 30 to outside without discarded sludge by performing a solublization process thereof by plasma.

Mode For The Invention

Figure 3:
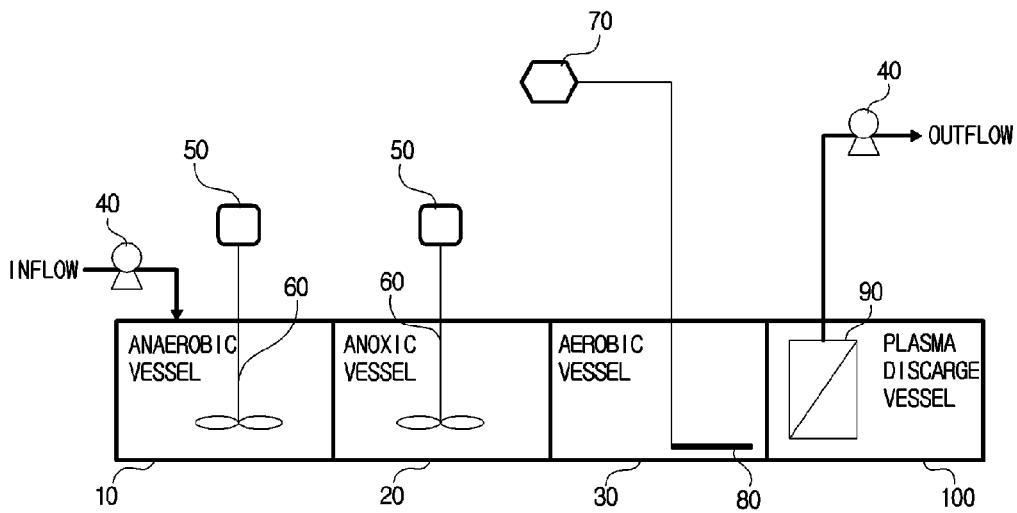
FIG. 3 is a mimetic diagram for describing one example of a cleaning mode of a membrane combined-type fouled/waste water advanced treatment system (a submerged membrane cleaning mode) with a plasma reaction vessel introduced according to the present invention.

FIG. 3 is a mimetic diagram for describing one example of a cleaning mode of a membrane connected-type advanced treatment system (a submerged-type membrane cleaning mode) with a plasma discharge vessel introduced according to the present invention.

As shown in herein, a plasma discharge vessel 100 according to the present invention may include in its inside a submerged-type membrane 90 that was installed inside the aerobic vessel 30.

Because in a drive mode of the above-described advanced treatment (sludge discharge mode, see FIG. 2), a submerged membrane 90 in an aerobic vessel 30 is formed with a cake layer after a certain time elapses, the present invention may remove this through a plasma discharge vessel 100. That is, transporting a membrane 90 provided in the aerobic vessel 30 to a plasma discharge vessel 100, and removing the contamination of the very equipped inside membrane 90 through plasma.

The present invention oxidizes a cake layer formed on a surface of a membrane 90 by each type of radical, ozone, etc. high in oxidizing power produced by plasma, and performs a cake layer cleaning process, so that a membrane fouling can be controlled. Since such a present invention may improve the lowered efficiency of a membrane due to increase of a trans-membrane pressure for flux decreases due to a cake layer formed on a membrane surface, thus has an effect of enabling a stable water-quality ensure.

To do this, the aerobic vessel 30 and the plasma discharge vessel 100 according to the invention each contains a means of permitting attach/removal of a submerged-type membrane 90 (not shown) in their inside, it is possible to selectively install the submerge-type membrane 90 to any one of an aerobic vessel 30 and a plasma discharge vessel 100 as needed.

On the one hand, according to the above-described, a plasma reaction vessel 100 of the invention may selectively perform any one of operating modes amongst a drive mode (sludge discharge mode) and a cleaning mode (submerged-type membrane cleaning mode).

Herein, the drive mode is a sludge discharge mode operating the plasma discharge vessel 100 in a state of a submerged-type membrane 90 mounted inside an aerobic vessel 30, and the cleaning mode is a submerged-type membrane cleaning mode operating a plasma discharge vessel 100 in a state a submerged-type membrane 90 that was mounted inside the aerobic vessel 30 is transported and mounted at the inside part of a plasma discharge vessel 100.

To do this, it is desirable that the present invention contains a means capable of selectively operating the sludge discharge mode and submerged-type membrane cleaning mode. For example, it may include an automation apparatus moving the membrane 90 from an aerobic vessel 30 to a plasma discharge vessel 100 and moving the same from the plasma discharge vessel 100 to the aerobic vessel 30, and a control part generating a discharging of a plasma discharge vessel 100 based on a position or time in which the membrane 90 is installed.

Therefore, according to the present invention, it is possible that the sludge discharge mode destructs and solublizes a cell membrane of sludge regarding a discharge process of a plasma discharge vessel 100 by sludge transported from an aerobic vessel 30. Together with this, it is practicable that the submerged-type membrane cleaning mode moves a submerged-type membrane 90 contaminated at an aerobic vessel 30 to a plasma reaction vessel 100, and then oxidizes a cake layer being formed on a membrane surface by discharged plasma, thereby eliminating fouling of a membrane.

Meanwhile, while the foregoing part has shown and described regarding a preferred embodiment specific in view of the present invention, it would be evident to those skilled in the art that various modifications and changes thereof can be made without departing from the technical features and fields of the invention as provided by the following claims.

Industrial Applicability

Reduction in sludge amount and membrane fouling control through underwater discharge using a plsama according to the invention may be a low energy/environment-friendly process method differently from a process of at a previous time producing secondary contaminants or requiring high energy.

The invention claimed is:

1. A fouled/waste water advanced treatment system sequentially containing an anaerobic vessel, an anoxic vessel and an aerobic vessel, the advanced treatment system comprising:
   a plasma discharge vessel continuously disposed at the aerobic vessel;
   a waste sludge conveyor pipe transferring sludge discharged from the aerobic vessel into the plasma discharge vessel, wherein each of the aerobic vessel and the plasma discharge vessel comprises means for removing a submerged-type membrane from or placing the submerged-type membrane inside the aerobic vessel or the plasma discharge vessel;
   a sludge conveyor pipe transferring sludge byproducts electrically discharged from the plasma discharge vessel into the anoxic vessel;
   an automation apparatus moving the submerged-type membrane between the aerobic vessel and the plasma discharge vessel; and
   means for selectively operating:
      a mode for electrically discharging the sludge when the plasma discharge vessel is operated in a state in which the submerged-type membrane is placed inside the aerobic vessel; and
      a mode for cleaning the membrane when the plasma discharge vessel is operated in a state in which the submerged-type membrane is placed inside the plasma discharge vessel.

2. The advanced treatment system according to claim 1, wherein the submerged-type membrane included in the aerobic vessel is for a membrane bioreactor (MBR).

3. The advanced treatment system according to claim 1, wherein the submerged-type membrane included in the plasma discharge vessel is for a membrane bioreactor (MBR).

4. The advanced treatment system according to claim 1, further comprising a control part configured to control the discharging from the plasma discharge vessel based on a position or time in which the membrane is placed in the plasma discharge vessel.

* * * * *